(12) United States Patent
Chopard et al.

(10) Patent No.: US 11,174,033 B2
(45) Date of Patent: Nov. 16, 2021

(54) METAL INSULATING PART

(71) Applicant: Hutchinson, Paris (FR)

(72) Inventors: Fabrice Chopard, Saint Martin d'heres (FR); Yann Favier, Dommartin (FR); Cédric Huillet, Montargis (FR); Hmad Bourass, Amilly (FR); Yannick Thenault, Avrille (FR); Christophe Dominiak, Varennes Changy (FR)

(73) Assignee: Hutchinson, Paris (FR)

( * ) Notice: Subject to any disclaimer, the term of this patent is extended or adjusted under 35 U.S.C. 154(b) by 200 days.

(21) Appl. No.: 15/781,010

(22) PCT Filed: Dec. 2, 2016

(86) PCT No.: PCT/FR2016/053189
§ 371 (c)(1),
(2) Date: Jun. 1, 2018

(87) PCT Pub. No.: WO2017/093692
PCT Pub. Date: Jun. 8, 2017

(65) Prior Publication Data
US 2020/0283161 A1  Sep. 10, 2020

(30) Foreign Application Priority Data

Dec. 2, 2015 (FR) ..................................... 1561726

(51) Int. Cl.
*B64D 29/06* (2006.01)
*B32B 7/05* (2019.01)
(Continued)

(52) U.S. Cl.
CPC ............... *B64D 29/06* (2013.01); *B32B 7/05* (2019.01); *B32B 7/08* (2013.01); *B32B 15/18* (2013.01);
(Continued)

(58) Field of Classification Search
CPC ........ F16L 59/06; F16L 59/065; B64D 29/06; B64C 1/40; B32B 2307/304
See application file for complete search history.

(56) References Cited

U.S. PATENT DOCUMENTS 9,157,230 B2   10/2015  Feinerman et al.
9,243,726 B2 *  1/2016  Reid .......................... F16L 9/14
(Continued)

FOREIGN PATENT DOCUMENTS

DE   10 2011 002 248 A1   10/2011
EP       2 345 770 A1    7/2011
(Continued)

*Primary Examiner* — J. Woodrow Eldred
(74) *Attorney, Agent, or Firm* — Blank Rome LLP

(57) ABSTRACT

The invention concerns an insulating part comprising a sealed casing defining an inner enclosure (7), the part having thermal conductivity of less than 100 mW/m.K, the sealed casing (3) comprising at least one thin metal sheet (30, 31) having a thickness of less than 1 mm and welded peripherally to keep the enclosure under low pressure and/or controlled atmosphere, the weld, which is produced in a chamber under low pressure and/or controlled atmosphere, having a leakage rate of less than $10^{-6}$ Pa·m³/s, after a first thermal treatment according to the standard RTCA-DO 160-G, section 5, Cat A (from −55° C. to 400° C.) and a second thermal treatment at −196° C. for 1 hour.

20 Claims, 6 Drawing Sheets

Figure 1:
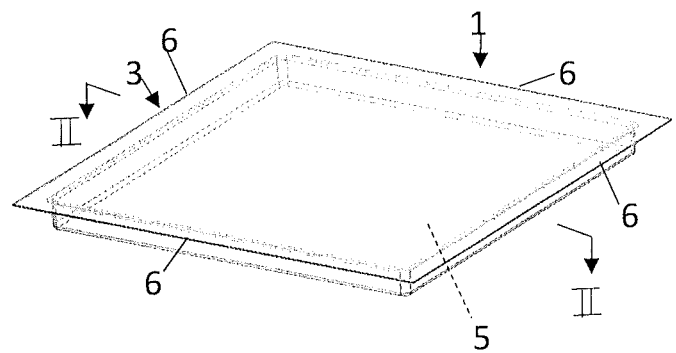

(51) Int. Cl.
 *B32B 7/08* (2019.01)
 *B32B 15/18* (2006.01)
 *B32B 15/20* (2006.01)
 *B64C 1/40* (2006.01)
 *F16L 59/065* (2006.01)

(52) U.S. Cl.
 CPC ............... *B32B 15/20* (2013.01); *B64C 1/40* (2013.01); *B32B 2250/03* (2013.01); *B32B 2250/40* (2013.01); *B32B 2307/302* (2013.01); *B32B 2307/304* (2013.01); *B32B 2307/536* (2013.01); *B32B 2307/54* (2013.01); *B32B 2605/18* (2013.01); *F16L 59/065* (2013.01)

(56) References Cited

U.S. PATENT DOCUMENTS

| | | | |
|---|---|---|---|
| 9,644,781 B2 * | 5/2017 | Thiery | B32B 27/32 |
| 10,697,698 B2 * | 6/2020 | Dherde | B21D 22/022 |

FOREIGN PATENT DOCUMENTS

| | | |
|---|---|---|
| EP | 2 829 689 A1 | 1/2015 |
| FR | 2 996 850 A1 | 4/2014 |
| JP | 2006-275186 A | 10/2006 |
| JP | 2014-163494 A | 9/2014 |
| WO | WO 2015/121540 A1 | 8/2015 |

\* cited by examiner

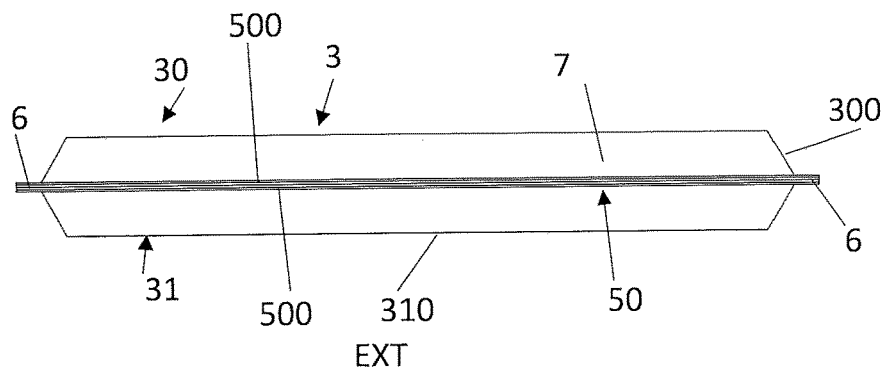
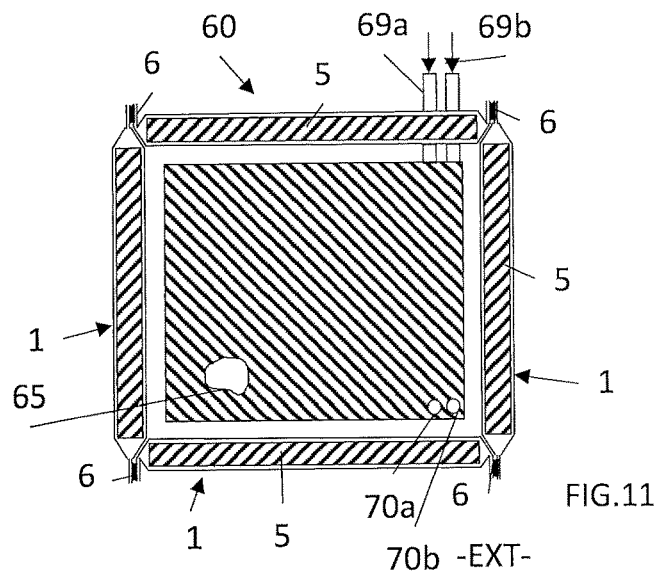
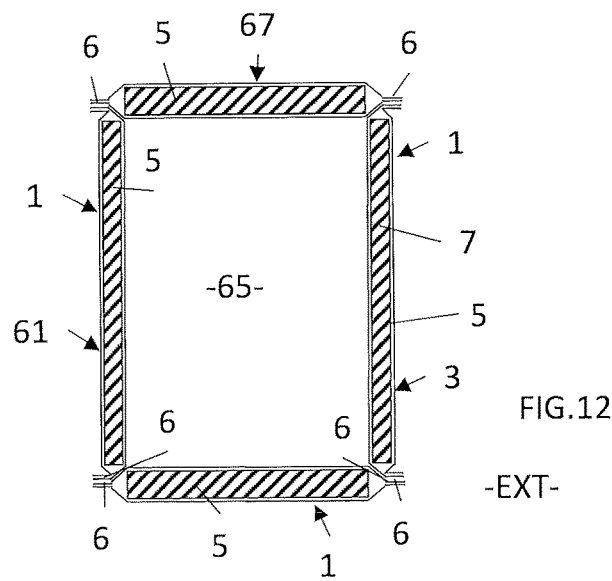
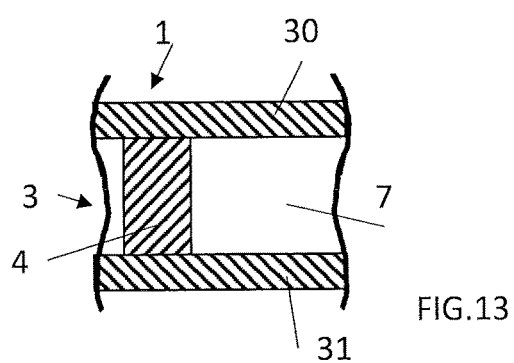

METAL INSULATING PART

CROSS-REFERENCE TO RELATED APPLICATIONS

This application is a national stage of International Application No. PCT/FR2016/053189, filed on Dec. 2, 2016, which claims the benefit of French Patent Application No. 1561726, filed on Dec. 2, 2015, the contents of each of which are incorporated herein by reference.

The present invention relates to the field of thermal management.

It especially relates to an insulating part under a controlled atmosphere (in particular a vacuum insulated panel or VIP) and its manufacturing process.

Patent publications (such as U.S. Pat. No. 9,157,230) have already addressed these topics.

However, a problem remains in connection with the strength of the part over time, in other words its reliability and efficiency in terms of thermal management of the environment in which it is placed, and this even the more so if the environment is subject to strict standards, such as in the aerospace sector in which components in a vacuum are very rarely recommended, given the inherent risk of leakage and thus of loss of vacuum and of functionality.

Without specifically mentioning the areas of critical applications, U.S. Pat. No. 9,157,230 proposes a VIP part intended to reduce the leakage of heat with respect to a structure opposite which the part will be installed.

However, the described manufacturing process demands a restrictive implementation that is not justified in the eyes of the inventors in that it does not make it possible, in their opinion, to sufficiently guarantee a decadal or multi-decadal longevity of the parts under satisfactory operational conditions.

One aspect of the invention aims to address this problem and prejudice, which becomes critical when a flawed thermal management quality is not acceptable for many years, in a harsh environment: significant thermal stresses around an engine, risks of chemical or even mechanical aggression during maintenance, successive cycles of applied thermal stresses, in a vibratory environment and with pressure variations (in the case of aeronautical applications in particular).

Moreover, after analysis, it turns out that it is not the fineness of the metal sheet(s) that is involved, nor the fact that they are directly and continuously sealed together, or even the aforementioned thermal conductivity.

In fact, it has been found that the aforementioned flawed thermal management quality could be reduced if the welding conditions were reviewed and the leakage rate controlled in this area.

Consequently, what is proposed here is that a continuous weld of the enclosure, produced under a vacuum and/or under a controlled atmosphere, is such that it has a leakage rate of less than $10^{-6}$ Pa·m$^3$/s after a first thermal treatment according to RTCA-DO 160-G, section 5, Cat A (from −55° C. to 400° C.) and a second thermal treatment at −196° C. for 1 hour, where the thickness of the metal sheet(s) may only be less than 1 mm, without any limitation as to its (their) thermal conductivity, where the overall thermal conductivity of the part must be less than 100 mW/m.K at 20° C. and in an environment under atmospheric pressure, over the range of possible temperatures at which the part may be used, i.e. at least from −200° C. to 600° C., or even −269° C. to 1,100° C.

The aforementioned thickness of 1 mm, in particular with materials as those mentioned below, will allow for the overall thermal conductivities of the part and the intrinsic thermal conductivity of this (these) metal sheet(s) to be merged, because the thermal diffusion and heat losses will then be low.

In the present application:
"Part" refers to a part or component, plane or not (three-dimensional), of any shape.
"Low pressure" refers to a pressure lower than the ambient pressure (i.e. <$10^5$ Pa). A pressure in the enclosure ranging from $10^{-3}$ Pa to less than $10^5$ Pa may be particularly suitable.
"Controlled atmosphere" refers to a gas having a thermal conductivity that is lower than that of the ambient air, i.e. lower than 26 mW/m.K, such as $CO_2$ or argon.
According to the meaning recognized in the art, "welding" is considered as exclusive of brazing with supply of a filler material (typically metal or alloy) of a nature that is different from the assembled parts. In brazing, the filler material has a melting temperature that is typically lower than that of the assembled parts. Consequently, any welding or "sealing" will here be performed without any filler material and by locally melting the materials of the parts. The welding (the weld) must also be continuous, not spot welding. In this regard, the brazing tests were not conclusive. Intermetallic formations making the seal fragile were found. Moreover, sealing by brazing would require the development and use of specific metal frames for each part, which would imply significant costs and challenging implementation.

In terms of process, the solution becomes a method for manufacturing an insulating part, comprising steps in which:
two metal sheets or two portions of a said metal sheet are provided, a space being left between them, the or each metal sheet having a thickness of less than 1 mm and being selected from among the group consisting of stainless steel, titanium, aluminum and other metals with a thermal conductivity of less than 100 mW/m.K at 20° C. and in an environment under atmospheric pressure;
the metal sheet and/or the metal sheets are placed in a welding chamber under a low pressure and/or controlled atmosphere;
a low pressure lower than $10^5$ Pa is established in the chamber and said metal sheets or portions of said metal sheet are continuously welded one to another within the chamber (whether or not prior partial welding was performed outside the chamber), so that:
said space defines an inner enclosure under a low pressure and/or controlled atmosphere;
the weld has a leakage rate of less than $10^{-6}$ Pa·m$^3$/s, after the aforementioned first thermal treatment, and
an insulating part is formed, which has a thermal conductivity of less than 100 mW/m.K at 20° C. and in an environment under atmospheric pressure.

It can be noted from the above that the maximum temperature of the test has been reduced to 400° C. from the 550° C., in relation to RTCA-DO 160-G, section 5, Cat A.

Moreover, the leakage rates at the location of the weld must favorably be identical (to within 20%) before the test is applied according to the standard and after.

To promote the effectiveness of the insulation, or even mechanical strength, it is proposed that, prior to the step of establishing the low pressure, an inorganic or organic core material is enclosed between the two metal sheets or two portions of said metal sheet. The depressurization of the welding chamber for welding and in particular of the inner enclosure to limit thermal conductivity will thus also be operative, which would not have been the case with a mineral core material.

And, to put the welding step into practice, one among seam welding, electron beam welding, diffusion welding, induction welding and micro-plasma welding will preferably be used, in all cases in a said welding chamber under a controlled atmosphere, as mentioned above.

Furthermore, it has been noted that by using (at least) one corrugated thin metal sheet to produce the closed casing, a material deformation reserve will be available that is particularly useful for the fold areas or for absorbing at least part of the deformations of the casing walls due, among others, to thermal stresses. The overall rigidity will also be improved for the thinnest sheets.

In fact, the term "corrugated thin metal sheet" should be understood as a sheet having at least one material reserve area that is useful for:
  forming edges and/or fold areas, in particular when a volume or enclosure, which is to contain a thermal insulation, is to be created;
  and/or the absorption of thermal expansions, when two very distant temperatures are applied respectively on both sides of the part, as is the case in aeronautical and cryogenic applications.

Figure 7:
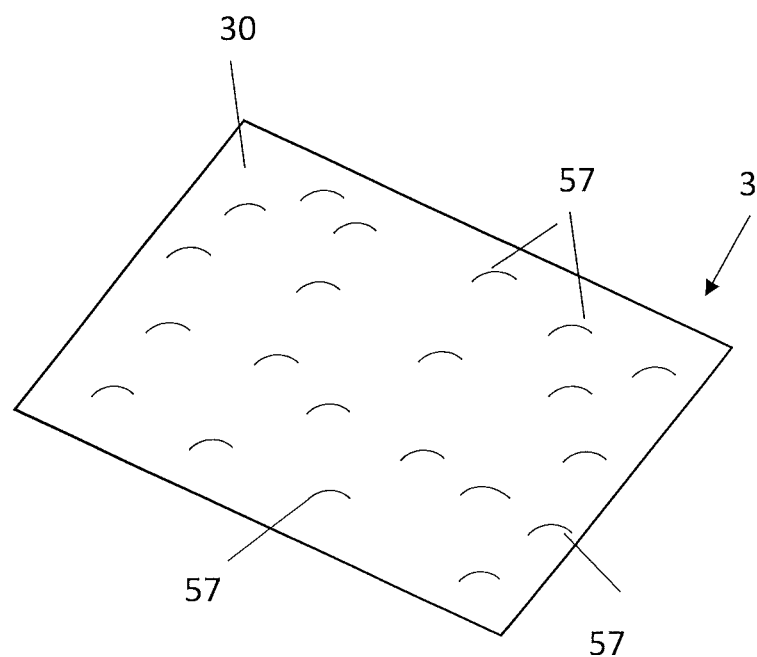

Thus, an alternative to actual corrugating, as shown in FIG. 7 below, could consist in providing at least one folding area that can be unfolded under a given load.

Another problem that the invention has taken into account relates to identifying any loss of insulation on the part, if it occurs.

As a relevant solution, it is proposed that said insulating part, having all or some of the aforementioned characteristics, be associated with a sensor to be installed externally on the side of a second face of the part opposite to a first face, where the structure to be thermally protected is located, the sensor being suitable for providing visual, acoustic, mechanical, electrical, or magnetic information.

An advantage of the insulating part, which has been found subsequently, if it is in a low pressure, is that it can not only provide a thermal insulation effect but also an effect that limits the transmission of certain frequencies, with a potential effect on certain vibrations and/or on acoustics.

One consequence of this is the proven ability to install said insulating part in either of the following:
  A connecting pylon between an aircraft engine and a wing
  An aircraft engine nacelle comprising an internal fixed structure (IFS) provided with said insulating part (in this case a VIP), which must have a curved shape In both cases, this is a major development given the existing prejudices that excluded VIP parts from the aeronautical or aerospace field, particularly near the engines of flying machines and, more specifically, dual flow turboshaft engines.

Another application in the field of cryogenics provides for the use of at least one said thermally insulating part, under an atmosphere of controlled pressure and/or composition, on a heat exchanger or a storage tank respectively subjected to the following:
  A temperature ranging from −150° C. to −273° C.; and
  A temperature difference between an internal volume and an external environment that is greater than 100° C.

Figure 2:
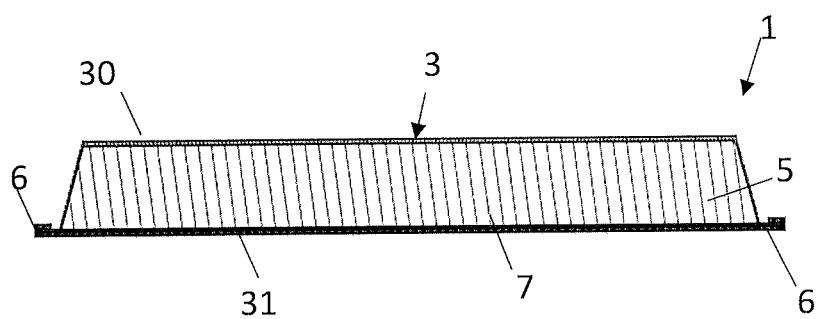
Figure 3:
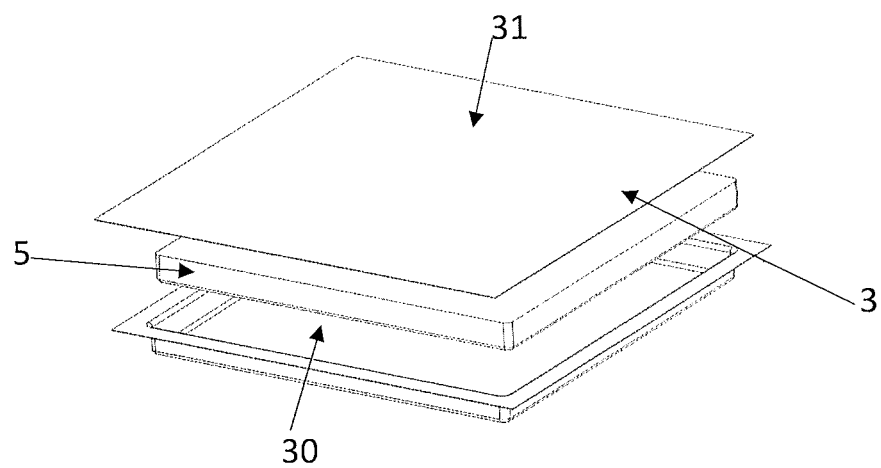
Figure 4:
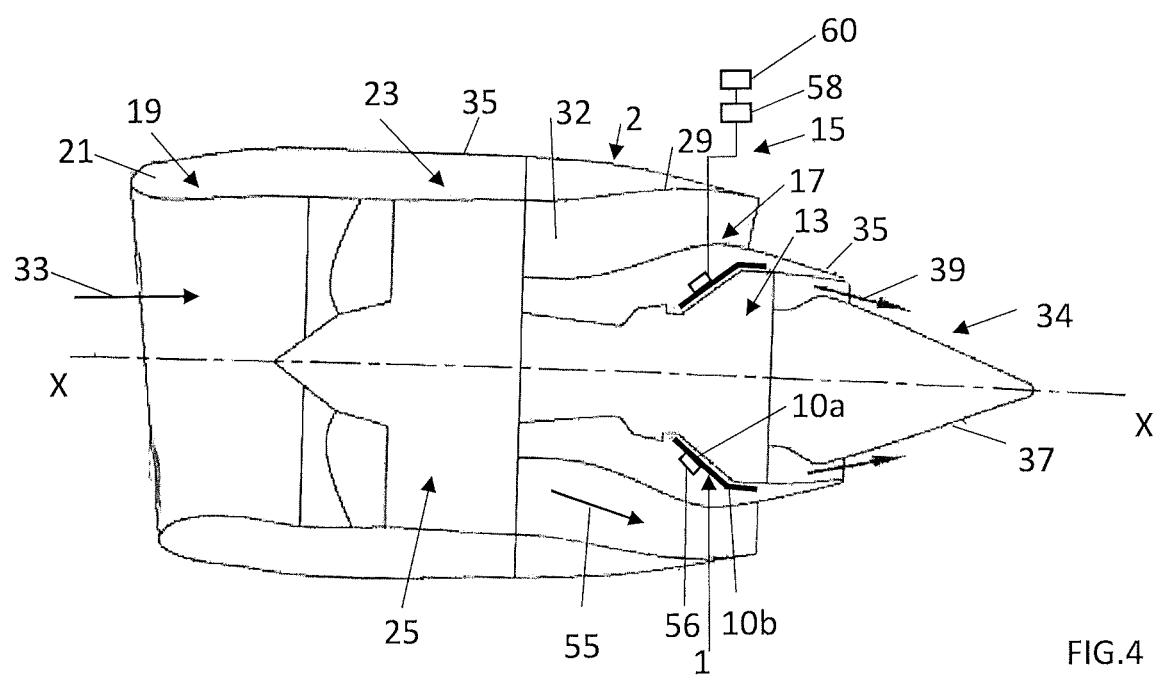
Figure 5:
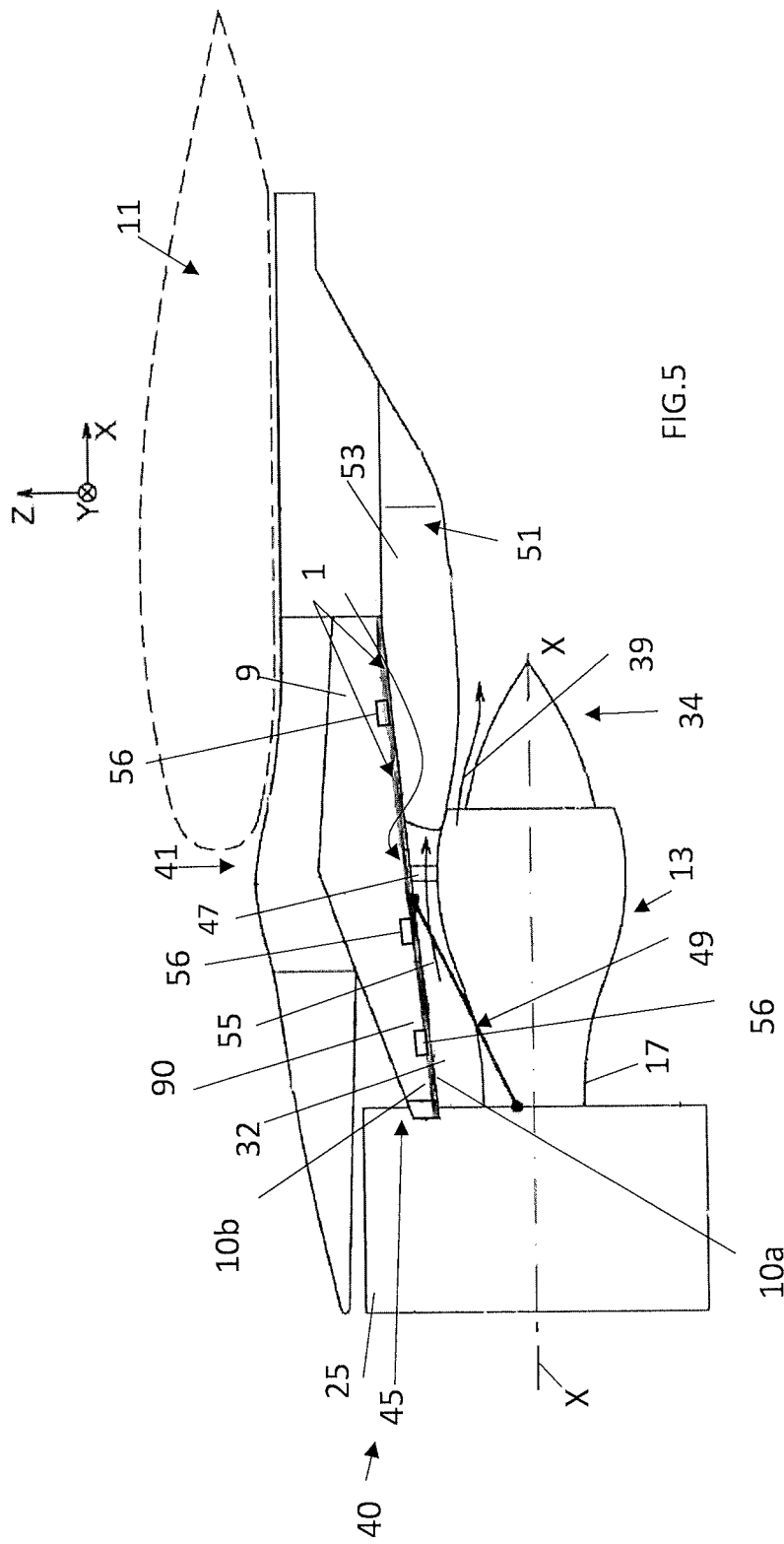
Figure 6:
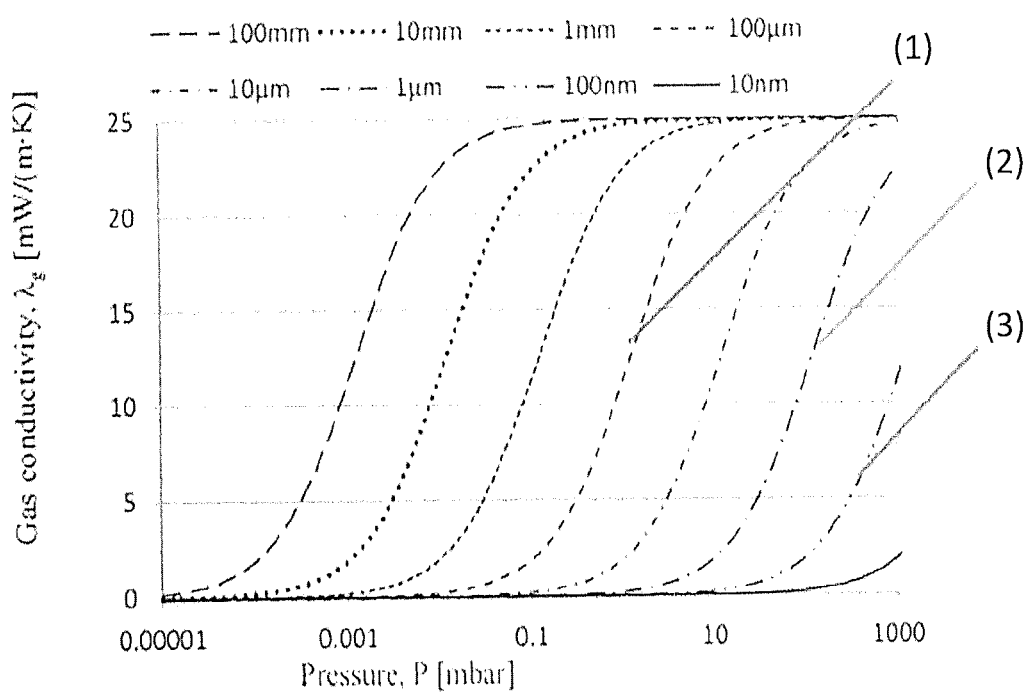
Figure 8:
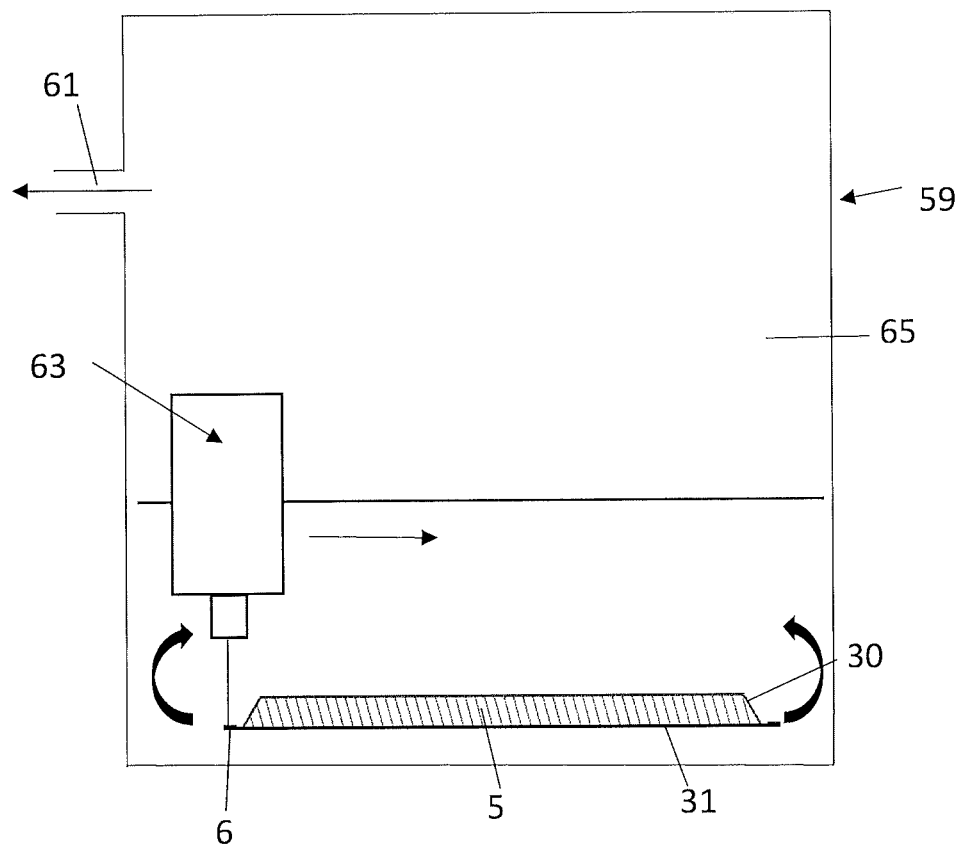
Figure 9:
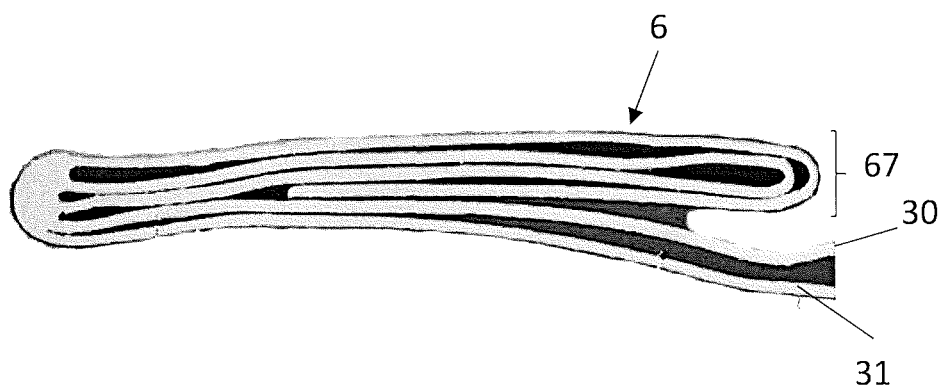

If necessary, the invention will be better understood and other characteristics, details and advantages thereof will become apparent upon reading the following description as a non-exhaustive example with reference to the appended drawings in which:

FIG. 1 is a diagram of a part according to the invention, FIG. 2 is the corresponding section along the line II-II, FIG. 3 is a corresponding exploded view before assembly, and FIGS. 10, 11, and 12 show three alternatives;

FIGS. 4 and 5 schematically show two applications of these parts;

FIG. 6 shows conductivity variation curves (λ) according to the pressure, for a few cores of parts;

FIG. 7 schematically shows an graining of a metal sheet;

FIG. 8 schematically shows a controlled atmosphere chamber containing a device for welding the part along its perimeter;

FIG. 9 schematically shows a multiple fold right where the continuous weld bead is to be produced;

FIG. 13 schematically shows the existence of spacers providing internal mechanical support to the metal sheets.

One aim of the present invention thus is to create a part under a controlled atmosphere (controlled pressure and/or composition) that is hermetically welded, puncture-resistant, inexpensive, has an actual longevity of several years (10 years and more are aimed for, or more than 50,000 duty cycles), is of arbitrary size and shape, and has a high thermal resistance R and thus a strong ability to reduce heat transfers in the location where it is installed.

One embodiment depicted in FIGS. 1-3 shows a thermally insulating part 1 comprising a closed, airtight casing 3 (see leakage rate in question) defining a closed enclosure 7 under a controlled atmosphere.

This controlled atmosphere may consist in the presence of a gas having a thermal conductivity of less than 26 mW/m.K (stagnant air).

Additionally or alternatively, the controlled atmosphere may consist in a pressure lower than atmospheric pressure.

Although the enclosure 7 may contain no structural element intended for insulation or as a thermal barrier, in this case it preferably contains a thermal insulation, as shown in FIGS. 1-3, or a thermo-reflective screen, as shown schematically in FIG. 10, to ensure the quality of this insulation.

In the embodiment shown in FIGS. 1-3, the thermal insulation is porous. This is advantageous. Here, "porous" refers to a material having interstices allowing the passage of air. Open cell porous materials therefore include foams but also fibrous materials (such as glass wool or rock wool). The interstices allowing passage that can be referred to as pores have sizes of less than 1 or 2 mm so as to ensure proper thermal insulation, and preferably of 1 micron, and particularly preferably of $10^{-9}$ m (nano-porous structure), in particular for reasons of mechanical strength and/or resistance to ageing and therefore of possibly less strong low pressure in the enclosure.

Among fibrous insulation materials, those which are minerals are defined in standard NF B 20-001. Mineral fibrous insulation materials are grouped into two major families: volcanic rock wool or slag wool and glass wool.

In the embodiment as shown schematically in FIGS. 1-3, the thermal insulation defines an organic or inorganic core material 5, which is not mineral.

This material provides structure to the part 1, i.e. it contributes to the mechanical strength of the part. In this embodiment, it is a monolith.

A core material 5 comprising an aerogel will be considered favorably, taking into account its advantages in terms of thermal conductivity, density, mechanical strength, ability to be molded into complex shapes.

In the illustrated versions, the casing 3 comprises two metal sheets 30, 31. The term "metal" covers alloys. The two sheets will in principle be identical, except for their size.

Alternatively, one could use only one metal sheet, folded on itself, so as to only need to weld on three sides if the part has four sides, as shown in FIGS. 1-3 (which is not restrictive). In such a situation, the peripheral welding 6 would be performed on two portions (the two folds) of this single metal sheet.

If it is provided, the core material 5 (or the screen 50 presented hereinafter) will of course be interposed between the sheets 30, 31. In an alternative, as shown in FIG. 13, spacers 4 could mechanically support the sheets 30, 31. These could be blocks distributed between the sheets in the enclosure 7. Each spacer 4 will favorably have a thermal conductivity less than or equal to 130 mW/m.K at 20° C. and in an environment under atmospheric pressure.

The controlled atmosphere in the enclosure 7 is a major parameter of the part 1, because it enables it to perform the function of super thermal insulation, if the core material 5 is a thermal insulation, and preferably a micro- or nanoporous insulation, in principle combined with a low pressure (with respect to the surrounding atmospheric pressure) in the enclosure 7.

In fact, combining a high-performance casing 3 with a controlled atmosphere and, in particular, a low pressure atmosphere, in the enclosure 7 will make it possible to obtain a VIP with a long service life, which, more specifically, can be installed in the nacelle 15, at the location of the internal structure 17 (also called inner fixed structure or IFS) that surrounds the upstream portion of the turbojet engine 13, as shown schematically in FIG. 4.

Another very relevant possibility, as shown schematically in FIG. 5, involves an installation in a connecting pylon 9 between an aircraft wing 11 and the engine 13 arranged in a nacelle, where the wing 11 can be replaced by an aircraft fuselage, if the engine 13 is fastened to it, as is the case on some aircraft, typically laterally, behind the wings.

In the first case (as shown in FIG. 4), the nacelle 15 comprises, along the longitudinal axis XX of the engine, an upstream section 19 with an air inlet lip 21, a middle section 23 surrounding a fan 25 of the turbojet engine 13 and a downstream section 27. The downstream section comprises said internal structure 17 (IFS), an outer structure (also called outer fixed structure (OFS) 29 and a movable cover (not shown). The IFS 17 as well as the OFS 29 delimit a vein 32 enabling the passage of an air flow 33 entering the engine, in this case into the fan 25.

A top end 35 of the nacelle receives a fastening pylon (which may be the structure 9 below) to fasten the nacelle 15 to a wing of the aircraft (not shown in FIG. 4). Longitudinally, the nacelle 15 ends with an ejection nozzle 34 comprising an external module 35 and an internal module 37 defining, between each other, a so-called hot primary air flow channel 39 coming out of the turbojet engine 13.

The parts 1 are arranged in the internal structure 17 (IFS), each part advantageously having a curved shape, in particular an rounded shape. An individual shape, generally in the form of ring sectors, will be suitable. The assembly then defines an annular shape, having end to end sectors along the circumference.

In the second case (as shown in FIG. 5), the parts 1 are arranged in (or placed under) the primary structure 43 of a fastening device 41. Typically, there can be several parts 1 placed in line successively along the substantially flat lower edge 90 of the pylon 9.

The engine assembly 40 intended to be fastened under the wing 11 (or hence on the side of a fuselage 110) here indeed comprises a fastening device 41 and the engine 13 fastened with it, below in the case of the wing. On the whole, the fastening device 41 comprises a rigid structure 9, carrying means for fastening the engine, these fastening means, to be fastened to the wing or to the fuselage, having a plurality of engine fasteners 45, 47, as well as a load transfer device 49. The rear aerodynamic fairing 51 of the engine fastening device is located under the rigid structure 43 in this case, the fairing is therefore interposed between the wings and the concerned engine 13. The fairing 51 may comprise two lateral parts 53, around which the secondary flow 55 of the engine is intended to curve.

In particular, in the two preceding applications, and more generally when safety requires it, sensors 56 may be arranged externally on the side of a second face 10b (less hot) of the insulating part(s) 1 opposite to a first face 10a on which the source or the structure to insulate is located (in this case, part of the engine's hot body). Each sensor can be active or passive and may provide visual, mechanical or electrical information. Stress, temperature, impedance and acoustic sensors are particularly suitable. Thus, using an indirect parameter sensed on or in the close proximity of the parts 1 and transmitted to a computer 58 and then to a display or warning device 60, it will be possible to provide information about the state of preservation of these parts and, specifically, about the preservation of the vacuum within.

It should also be noted that, in addition to a thermal protection, given the low pressure existing in the enclosure 7 and due to the limitation of the transmission of certain frequencies, the above two solutions are expected to provide a potential acoustic effect in the IFS application (first case) and a potential effect on some vibrations in the application with a primary fastening pylon structure (second case).

Two other applications are shown schematically in FIGS. 11 and 12. These are respectively a heat exchanger 60 and a storage tank 61, more specifically intended for storing tubes containing organic liquids, for the pharmaceutical industry or for biomedical laboratories.

In both cases, all or part of the walls of the heat exchanger or of the tank are made in the same way as the part 1. An internal useful volume 65 of the heat exchanger 60 or of the tank 61 thus is thermally insulated from the external environment (EXT).

The temperature in the internal useful volume 65 must range from −150° C. to −273° C. and the temperature difference between the volume 65 and this external environment (EXT; 67) must be greater than 100° C.

The volume 65 of the tank 61 can be closed by an openable or removable cover 67, also formed in the same way as a part 1.

In the heat exchanger 60, fluid inlets 69a, 69b and outlets 70a, 70b enable the circulation of at least two fluids to be placed in heat exchange relationship inside the heat exchanger 60 that the parts 1 protect thermally along its periphery. If the fluid inlets and outlets must pass through at least one part 1, a seal around each passage will be provided, typically by a continuous weld bead 6.

In both cases, all or part of the protective walls of the heat exchanger or of the tank are made in the same way as the part 1. An internal useful volume 65 of the heat exchanger 60 or of the tank 61 thus is thermally insulated from the external environment (EXT).

The temperature in the internal useful volume 65 must range from −150° C. to −273° C. and the temperature difference between the volume 65 and this external environment (EXT; 67) must be greater than 100° C.

The volume 65 of the tank 61 can be closed by an openable or removable cover 67, also formed in the same way as a part 1.

Whatever the application, it is the controlled atmosphere that prevails in each part 1 that will eliminate (reduce) the gaseous component of the thermal conductivity. However, at high temperature, as in the two applications above, the radiative component can have a great influence. This component can be absorbed by the opacity of the material. This absorption directly depends on the Rosseland mean extinction coefficient A of the material (see table below), when it comprises at least one porous insulating block:

| Composition | A (m2/kg) |
|---|---|
| $SiO_2$ | 22.7 |
| Opacified $SiO_2$ | 84.2 |
| $TiO_2$ | 32.6 |
| $ZrO_2$ | 38.9 |
| Carbon | >1000 |
| Resorcinol-formaldehyde (RF) | 50.1 |
| Melamine-formaldehyse (MF) | 47.2 |
| Polyurethane | 47.6 |
| Polystyrene | 47.8 |

In applications where the temperature substantially reaches or exceeds 200° C., or even 700° C., if not more in the second case, the interest in the blocks of core material 5 having a Rosseland mean extinction coefficient A greater than or equal to 30 should be noted. This is the case of a silica gel, or of the pyrolysed carbonaceous composition presented in FR-A-2996850 and whose evolution $\lambda=f(P)$ is shown in FIG. 6 (curve 2), which is recommended in its pyrolysate version (see FIG. 6, curve 3), to then produce the internal structure 5, in that it consists in the pyrolysate of an organic polymeric monolithic gel or said gel in the form of a porous super thermally insulating carbon monolith. The curves shown in FIG. 6 represent the evolution of the gaseous thermal conductivity according to the pressure, for various organic or inorganic porous materials. The values 10 nm, 100 nm, 100 microns, etc. are the characteristic pore sizes of the concerned material. Thus curve 3 represents the case of a nanoporous material (aerogel), curve 2 represents the case of a microporous material having 1 micron pores and curve 1 represents the case of a microporous material having 100-micron pores.

With such blocks or monoliths, it will be possible to form a thermal insulation 5 with a mechanically structuring effect (the polyurethane being an alternative, although significantly less thermally efficient). However, one advantage of the pyrolysate of the composition presented in FR-A-2996850 is that it is not flammable.

Alternatively, or in addition, a thermo-reflective screen 50 may be contained in the enclosure 7, as shown in FIG. 10, to limit the radiative exchanges (thermal radiation) through the part. This can be a multi-layer screen. The metal thermo-reflective screen 50 element may be fastened, including welded, with at least one of the metal sheets 30, 31 to keep it in place in the enclosure 7. The interest, in this case, in that the sheets 30, 31 are each formed in a bowl shape and arranged opposite to each other (as shown) so that the convex face, respectively 300, 310, faces outwards (EXT), still with the continuous weld 6 along the perimeter should be noted.

Thus, one may consider protections whose insulating function will be provided by a fairly high vacuum (typically less than $10^{-1}$ Pa) in combination with thermo-reflective films 500. These will advantageously be strips whose thermal wave reflection coefficient, a wavelength ranging from 0.1 μm to 100 μm, is high enough to stop the heat emitted by radiation by reflecting it. A relevant solution will comprise metal strips forming a casing with an internal pressure $<10^3$ Pa and one or several thermo-reflective films with a total thickness of less than 100 cm. Each film must have a very low emissivity: ideally <0.1. Another solution with a succession of layers of aluminised mylar™ film and of insulating felt is also possible.

Regardless of the nature of the element 5, and even if, for example, a CO2 atmosphere in the enclosure 7 may be suitable in some cases that are less demanding in terms of thermal insulation, it is considered that it is still the pressure in the enclosure which will enable the parts 1 to achieve a really low thermal conductivity. In practice, the pressure in the enclosure 7 will thus favorably range from 0.00001 mbar to less than 1,000 mbar (1,000 mbar=$10^5$ Pa), at the beginning of service life (within one year or the months following manufacture). Furthermore, with an internal pressure of 1 Pa, sheets and a core material 5 according to FR-A-2996850 with a thickness of 10 mm, a leakage rate as mentioned above (typically $10^{-10}$ Pa·m$^3$/s), the part 1 must guarantee an internal pressure of no more than $10^3$ Pa (10 mbar) after at least 50,000 temperature cycles in accordance with RTCA-DO 160-G, section 5, Cat A (from −55° C. to 400° C.), with identical leakage rates (within 20%) before the test is applied according to the standard and after.

In this respect, it can be inferred from FIG. 6 that, if the maximum permissible pressure in the enclosure 7, at the end or beginning of the service life of the part 1, is set to 100 mbar, then no material whose porosity is greater than 10 nm will be as efficient as are both the gel in the curve (2) and its pyrolysate (curve 3), compared to a core 5 made of PU (polyurethane); curve (1).

A low pressure in the casing 3 will generate a pressure difference, which can reach $10^5$ Pa, between the external environment and the enclosure 7. The casing 3 cannot absorb this constraint alone if its thickness is less than 1 mm. Therefore, it is then the core material (structure 5) that will be subjected to compression. Reinforcements in this material may further assist in supporting the casing 3. These reinforcements may be shims or special structures such as honeycombs. However, no spacer, other than an organic or inorganic core material 5, may be considered in the enclosure 7, as it could/would create a thermal bridge between the two sheets 30, 31.

If the at least one of the sheets 30, 31 is made of corrugated metal (for example, achieved using embossed rollers), thus with domes 57 as shown schematically in FIG. 7, it will also be possible to improve the mechanical strength of the part 1.

One or more getters (or gas traps) intended to prevent oxidation of the core material and to settle the gases that enter the enclosure 7 through the junction 6 or that are emitted by the core 5 during its life cycle may be provided. Each getter will allow for the pressure increase to be limited and moisture to be captured, hence an impact on conductivity.

Be that as it may, the part 1 will have a temperature range of −200° C. to 600° C., a thermal conductivity ranging from 1 mW/m.K to 300 W/m.K, and favorably less than 26 mW/m.K (air) at 20° C. and in an environment under atmospheric pressure.

And according to a characteristic that is essential for the strength of the part over time, as already mentioned, the continuous weld 6 of the metal sheet(s) of the casing, produced under a controlled atmosphere, must have a leakage rate of less than $10^{-6}$ Pa·m³/s, and less than $10^{-9}$ Pa·m³/s for sheet 30, 31 thicknesses greater than 70 μm, after a first thermal treatment according to standard RTCA-DO 160-G, section 5, Cat A (from −55° C. to 400° C.) and a second thermal treatment at −196° C. for 1 hour. This will at least make it possible to rule out the possibility that the sheet(s) 30, 31 are lined with plastic, for example, and that there is no direct metal/metal welding, each sheet effectively and in principle forming both the internal and external limit of the casing 3.

The internal pressure of the enclosure 7 can thus be maintained for periods of the order of 10 years and slightly more.

The leakage rate is expressed according to the following formula:

$$\tau = \Delta padmissible \cdot \frac{\text{volume under vacuum}}{\text{Service life}}$$

Δpadmissible is the difference, in Pa, between the admissible end-of-life pressure in the part and the admissible pressure at the beginning of its life;
The Volume under vacuum is the volume of the enclosure 7, in m³;
The Service life is expressed in s.

For example, for a protection consisting of an enclosure 7 with a volume of 1 L under vacuum, a service life of 3 years corresponds to a leakage rate of $10^{-8}$ Pa·m³/s. A table referencing the leakage rates and lifetimes to protect a volume of one litre and for an end-of-life pressure difference of 10 mbar is provided below.

| Leakage rate mbar · L/s | |
|---|---|
| 1.E−04 | 1 day |
| 1.E−05 | 12 days |
| 1.E−06 | 116 days |
| 1.E−07 | 3 years |
| 1.E−08 | 32 years |
| 1.E−09 | 317 years |

Leakage rates will be measured according to the following standards:
ISO 17025: General requirements for the competence of testing and calibration laboratories
ISO 3530: Vacuum technology—Mass-spectrometer-type leak-detector calibration A helium test may be required if the leakage rate to be measured is less than $10^{-4}$ Pa·m³/s. Above this figure, an air under water test can be used.

An important aspect will therefore be related to the type of weld 6 made.

FIG. 8 schematically shows the fact that it is a weld 6 produced under a controlled atmosphere, directly in the internal volume 65' of a controlled atmosphere chamber 59.

Thanks to a gas evacuation system 61, the residing pressure is less than $10^5$ Pa, preferably between $10^{-6}$ Pa and $10^2$ Pa, and more preferably less than $10^0$ Pa. And it is thus in this chamber 59 that a welding machine 63 has been previously placed. Once the suitable low pressure has been achieved in the volume 65', this machine will thus perform the welding at the area 6, along a single continuous line, where the sheets or portions concerned will have preferably been clamped together.

Alternatively, or in, addition, the system 61 could be used to substitute air for CO2 in the volume 65 of the chamber 59.

It is also possible that only part of the continuous weld 6 is made in the chamber 59. It is therefore possible to continuously weld outside the chamber 59 three of the four sides in the solution shown in FIG. 1, the fourth being continuously welded in the closed chamber 59. The important thing is that the controlled atmosphere of the chamber can reach the internal volume 7 before the periphery of this volume is entirely closed by the weld 6.

Even if other types of welding under a controlled atmosphere may be provided, this seal will favorably include one among seam welding, electron beam welding, diffusion welding, induction welding or micro-plasma welding thus performed using the suitable machine 63.

Thus, if an organic or inorganic core material 5 is provided, when the time comes the following will be sufficient:
enclosing the core material between the metal sheets (or sheet portions) 30, 31;
before or after, placing this or these sheets enclosing the core material in the chamber 59;
establishing a low pressure lower than $10^5$ Pa in the volume 65, preferably less than or equal to $10^4$ Pa for electron beam or diffusion welding;
and to thus to directly and continuously weld these sheets or sheet portions one to another;
this until the aforementioned enclosure 7 under low pressure is obtained around the core material 5 with the very reduced leakage rate already specified for the weld 6. The chamber 59 will then be opened and a part 1 ready for use will be retrieved.

To test the leakage rate of the weld 6, the part 1 will be subjected to a first thermal treatment according to the standard RTCA-DO 160-G, section 5, Cat A (from −55° C. to 400° C.) and to a second thermal treatment at −196° C. for 1 hour. In practice, the leakage rates at the location of the weld must favorably be identical (to within 20%) before the test is applied according to the standard and after.

The lower the thickness of the metal at the location of the weld 6 to be achieved (typically less than 0.5 mm) is, the more the expected leakage rate will be difficult to achieve.

For an application (such as in aeronautics) where weight is a critical parameter, if the thickness of the sheet(s) 30, 31 is less than 0.5 mm per sheet (e.g. for 304 L grade stainless steel sheets, about 0.08 mm thick), it is advisable that around the entire periphery of the weld 6 the sheets or the portions concerned are folded on themselves, in the form of a double fold, reference 67 on FIG. 9.

Three other parameters have been noted as being able to influence the expected performance of the part 1 over time. We recommend the following:
A hardness ranging from 300 N/mm² to 2,350 N/mm²
A mechanical strength Rm greater than or equal to 20 MPa
An elongation at break ranging from 5% to 50%
More specifically:
Regarding elongation at break: Bronze, with an elongation of 50%, and zinc, with an elongation of 80%, count among the most ductile metals. Furthermore, zinc and aluminum are not suitable for withstanding temperatures above 200° C., while temperatures in an IFS application, for example, can reach about 700° C. and even higher. As for ceramics, they have elongations of about 0.0001%. However, a material with an elongation of less than 5% is not formable (even when hot forming). It may thus be difficult, for some applications, to make a high-performance part 1, if the elongation at break is not contained between 5% and 50% (at room temperature).

Elongation may be measured using a tensile test according to "EN ISO 6892-1: Metallic materials—Tensile testing—Part 1: Method of test at room temperature "

Regarding mechanical strength (Rm): The mechanical strength of metals typically range from 4 Mpa to 3000 Mpa. If we exclude gold and lead, which are not in common use, the lower Rm value can be set to 20 Mpa. Mechanical strength is measurable using a tensile or hardness test. For a tensile test, refer to the standard above. For a hardness test, see below.

Regarding hardness: The casing 3 is defined as a container that has the following hardness properties at its junction 6, after a test according to the standard RTCA-DO 160-G, section 5, Cat A (from −55° C. to 400° C.).

The hardness test can measure a Vickers hardness according to the following standards:

EN ISO 6507-1—Vickers hardness test—Test method
EN ISO 6507-2—Vickers hardness test—Verification and calibration of testing machines
EN ISO 6507-3—Vickers hardness test—Calibration of reference blocks Tests performed on tested parts 1 indicate a hardness of 200 HV (660 N/mm$^2$). However, when referring to the boundaries of the mechanical strength value range of steel alloys and titanium, the hardness should favorably range from 90 HV (310 N/mm$^2$) to 670 HV (approx. 2,350 N/mm$^2$). Aluminum and zinc have lower hardnesses.

The invention claimed is:

1. A thermal insulating part comprising a sealed casing defining an inner enclosure, under a low pressure, lower than $10^5$ Pa, or a gas atmosphere containing a gas having a thermal conductivity lower than 26 mW/m·K, the thermal insulating part having a thermal conductivity of less than 100 mW/m·K at 20° C. and in an environment under atmospheric pressure, the sealed casing comprising at least one thin metal sheet having a thickness of less than 1 mm, said at least one thin metal sheet being welded peripherally, to keep the enclosure under said low pressure or in said gas atmosphere, the weld having a leakage rate of less than $10^{-6}$ Pa·m$^3$/s, after a first thermal treatment according to the standard RTCA-DO 160-G, section 5, Cat A from −55° C. to 400° C., and a second thermal treatment at −196° C. for 1 hour.

2. The thermal insulating part of claim 1, wherein the inner enclosure is under said low pressure, wherein the sealed casing has a thickness of more than 1 mm and comprises two of said thin metal sheets bonded together by said peripheral weld, wherein the sealed casing surrounds a core material comprising an organic or inorganic porous thermal insulation contained in the inner enclosure, and wherein the core material has a mechanical strength adapted to assist said two thin metal sheets to resist compression induced by the low pressure.

3. The thermal insulating part of claim 1, wherein the sealed casing contains shims or spacers, each of which has a thermal conductivity less than or equal to 130 mW/m·K, at 20° C. and in an environment under atmospheric pressure, to mechanically support the sealed cashing in the inner enclosure.

4. The thermal insulating part of claim 1, wherein said at least one thin metal sheet is corrugated to absorb at least part of a deformation of the sealed casing due to thermal stresses.

5. The thermal insulating part of claim 1, wherein said at least one thin metal sheet has the following:

a hardness ranging from 300 N/mm$^2$ to 2,350 N/mm$^2$
a mechanical strength Rm greater than or equal to 20 MPa
an elongation at break ranging from 5% to 50%.

6. The thermal insulating part of claim 1, wherein the inner enclosure is under said low pressure, wherein a core material comprising a porous thermal insulation material is housed in the inner enclosure, and wherein the core material is structural, so that it contributes to the mechanical strength of the thermal insulating part.

7. An assembly intended to limit a thermal leakage in a pylon arranged between an aircraft engine and one of a wing and a fuselage of said aircraft, for attaching the aircraft engine to said one of the wing and the fuselage, the assembly comprising:

the pylon which has a substantially flat edge,
several thermal insulating parts, each according to of claim 1, said several thermal insulating parts being arranged along said substantially flat edge of the pylon,
at least one sensor, a computer and a warning device, each connected to the at least one sensor, to deliver an information in relation to a state of preservation of the low pressure within said at least one of the thermal insulating parts or a variation of thermal conductivity in said at least one of the insulating parts.

8. An assembly intended to limit a thermal leakage in a nacelle of a turbojet engine, the assembly comprising:

a primary air flow channel for exhausting gas from the turbojet engine, an internal fixed structure arranged, in the nacelle, around the primary air flow channel,
the thermal insulating part of claim 1, said thermal the insulating part having a curved shape,
a sensor, a computer and a warning device, each connected to the sensor, to deliver an information in relation to a state of preservation of said low pressure within the thermal insulating part or a variation of insulating part thermal conductivity.

9. A method for manufacturing an insulating part, the method comprising steps wherein:

two metal sheets or two portions of a metal sheet are provided, spaced apart by a space, the metal sheet or each metal sheet of the two metal sheets having a thickness of less than 1 mm and being selected from among a group consisting of stainless steel, titanium, aluminium and other metals or metal alloys, each metal or metal alloy in said group having a thermal conductivity of less than 300 W/m·K at 20° C. and in an environment under atmospheric pressure;
the two metal sheets or two portions of metal sheet are placed in a vacuum chamber;
a low pressure lower than $10^5$ Pa is established in the vacuum chamber and said two metal sheets or portions of said metal sheet are welded one to another within the vacuum chamber, so that:
said space defines an inner enclosure under said low pressure;
the weld has a leakage rate of less than $10^{-6}$ Pa·m$^3$/s, after a first thermal treatment according to the standard RTCA-DO 160-G, section 5, Cat A from −55° C. to 400° C. and a second thermal treatment at −196° C. for 1 hour; and
a thermal insulating part is formed, which has a thermal conductivity of less than 100 mW/m·K at 20° C. and in an environment under atmospheric pressure.

10. A method for manufacturing an insulating part, the method comprising steps wherein:

two metal sheets are provided, spaced apart by a space, each metal sheet of the two metal sheets having a plurality of sides and a thickness of less than 1 mm and being selected from among a group consisting of stainless steel, titanium, aluminum and other metals or metal alloys, each metal or metal alloy in said group having a thermal conductivity of less than 300 W/m·K, at 20° C. and in an environment under atmospheric pressure;

the two metal sheets are placed in a vacuum chamber, after having continuously welded together the two metal sheets along said plurality of sides except at least one, so that at least one remaining side of the two metal sheets is not yet welded, a low pressure lower than $10^5$ Pa is established in the vacuum chamber and said two metal sheets are welded one to another within the vacuum chamber, along said at least one remaining side, so that:

a weld is provided along a perimeter of the two metal sheets following said plurality of sides, said space defines an inner enclosure under said low pressure;

the welded perimeter has a leakage rate of less than $10^{-6}$ Pa·m$^3$/s, after a first thermal treatment according to the standard RTCA-DO 160-G, section 5, Cat A from −55° C. to 400° C. and a second thermal treatment at −196° C. for 1 hour; and a thermal insulating part is formed, which has a thermal conductivity of less than 100 mW/m·K, at 20° C. and in an environment under atmospheric pressure.

11. An assembly intended to thermally protect a structure or limit a thermal leakage from a structure, the assembly comprising:

the structure, the thermal insulating part of claim 6, and a sensor adapted to deliver an information in relation to a state of preservation of the low pressure within the thermal insulating part or in relation to a variation of insulating part thermal conductivity.

12. The assembly of claim 11, wherein the sensor is arranged on a second face of the thermal insulating part opposite to a first face of the thermal insulating part directed to said structure.

13. The assembly of claim 11, wherein the sensor is sensitive to a parameter of said thermal insulating part, including a mechanical parameter, a stress parameter, an impedance parameter, a temperature parameter, an electrical parameter, a magnetic parameter and an acoustic parameter.

14. The assembly of claim 8 comprising several of said thermal insulating parts arranged end to end, as sectors along a circumference.

15. The assembly of claim 11, wherein the sensor is one of a stress sensor, a temperature sensor, an impedance sensor, and an acoustic sensor.

16. The assembly of claim 7, wherein the sensor is one of a stress sensor, a temperature sensor, an impedance sensor, and an acoustic sensor.

17. The assembly of claim 8, wherein the sensor is one of a stress sensor, a temperature sensor, an impedance sensor, and an acoustic sensor.

18. The thermal insulating part of claim 2, wherein the two thin metal sheets have a same thickness and are stainless steel sheets of about 0.08 mm thick each.

19. The thermal insulating part of claim 6, wherein the core material is a monolith.

20. The thermal insulating part of claim 2 wherein, at the location where they are bonded together by said peripheral weld, the two thin metal sheets are each free of any portion of metal folded on itself.

* * * * *